United States Patent [19]

Fasnacht et al.

[11] Patent Number: 5,535,298
[45] Date of Patent: Jul. 9, 1996

[54] PEDESTAL FOR FIBER OPTIC CABLE

[75] Inventors: Matthew J. Fasnacht, Mechanicsburg; Ronald R. Schaffer, Harrisburg, both of Pa.

[73] Assignee: The Whitaker Corporation, Wilmington, Del.

[21] Appl. No.: 380,876

[22] Filed: Jan. 30, 1995

[51] Int. Cl.⁶ ................................................. G02B 6/36
[52] U.S. Cl. ................................................. 385/135
[58] Field of Search ................................. 385/134, 135, 385/136, 137, 95, 98, 66; 206/557, 558, 565

[56] References Cited

U.S. PATENT DOCUMENTS

| | | | |
|---|---|---|---|
| 4,717,231 | 1/1988 | Dewez et al. | 350/96.20 |
| 4,792,203 | 12/1988 | Nelson et al. | 350/96.20 |
| 4,962,989 | 10/1990 | Jung et al. | 350/96.20 |
| 5,093,887 | 3/1992 | Witte | 385/135 |
| 5,100,221 | 3/1992 | Carney et al. | 382/135 |
| 5,129,030 | 7/1992 | Petrunia | 385/135 |
| 5,142,606 | 8/1992 | Carney et al. | 385/134 |
| 5,142,607 | 8/1992 | Petrotta et al. | 385/135 |
| 5,146,532 | 9/1992 | Hodge | 385/136 |
| 5,163,988 | 11/1992 | Setaishi et al. | 65/4.1 |
| 5,167,001 | 11/1992 | Debortoli et al. | 385/135 |
| 5,185,845 | 2/1993 | Jones | 385/135 |
| 5,208,894 | 5/1993 | Johnson et al. | 385/135 |
| 5,278,933 | 1/1994 | Hunsinger et al. | 385/134 |
| 5,311,612 | 5/1994 | Vincent et al. | 385/135 |
| 5,402,515 | 3/1995 | Vidacovich et al. | 385/135 |
| 5,420,958 | 5/1995 | Henson et al. | 385/135 |

FOREIGN PATENT DOCUMENTS

| | | |
|---|---|---|
| 0108590A1 | 5/1984 | European Pat. Off. . |
| 0392935A1 | 10/1990 | European Pat. Off. . |
| 0434530 | 6/1991 | European Pat. Off. ............. 385/135 |
| 4207531A1 | 3/1992 | Germany . |
| 61-87107 | 5/1986 | Japan ................................. 385/135 |

OTHER PUBLICATIONS

Rogers Data Sheet, "Poron Cellular Urethanes", five pages; 1991; Robers Corporation, East Woodstock, CN.
ADC Catalog, "Fiber Panel Accessories", p. 52; 1992; ADC Telecommunications, Inc., Minneapolis, MN.
AMP Instruction Sheet 408–4077, "Installation Instructions for AMP Fiber–Optic Central Splice Enclosures", six pages., Nov. 30, 1994; AMP Incorporated, Harrisburg, PA.

*Primary Examiner*—John Ngo
*Attorney, Agent, or Firm*—Anton P. Ness

[57] ABSTRACT

A pedestal (10) for interconnection of fiber optic members (54) of fiber optic cable articles such as cables (52), and especially where the cables have been inserted through routing tubes (36). Routing tubes (36) are secured using arrays of tube holders (30) at several locations, defining routing regions within pedestal (10) along each side of a centrally located fiber splicing region (28). Each tube holder includes a pair of rigid support members (72,74) coextending from a mounting bracket (70) in parallel spaced apart from each other to define a tube receiving slot (66), with elastically compressible inserts (80,82) secured to each rigid support member and spaced slightly from each other along the tube receiving slot (66). The rigid support members (72,74) are latchable together at the entrance of the slot upon insertion of the tubes (36) thereinto. The inserts (80,82) are of a material compressible upon placement of the tubes into the slot (66), enabling each routing tube (36) to be gripped therebetween with sufficient force to assuredly hold it in place even when other routing tubes are being inserted into or removed from the slot (66), without deforming the flexible tubes (36) which would interfere with blowing the fiber optic cables through the routing tubes.

18 Claims, 6 Drawing Sheets

PEDESTAL FOR FIBER OPTIC CABLE

FIELD OF THE INVENTION

The present invention relates to the field of pedestals, enclosures and cabinets for fiber optic interconnection, and more particularly for splicing of optical fibers of cables such as where such cables are blown through routing tubes that have been routed through premises and their concluding end portions routed into interconnection cabinets.

BACKGROUND OF THE INVENTION

It is often necessary to splice the ends of optical fibers from one fiber optic cable to corresponding ends of optical fibers from another fiber optic cable. This is accomplished by "breaking out" a portion of each of the fiber optic cables, whereby the end portions of the optical fibers therein are exposed by stripping the protective jacket from the end of the fiber optic cable. The corresponding optical fibers are then spliced together using various techniques, such as fusion splicing or mechanical splicing. Generous end portion lengths of each of the spliced fibers adjacent the splice are looped and held on the splice tray, and the splice tray affixed within the cable management cabinet housing many such trays for splicing of many optical fibers of cables of a large fiber optic system, such as a telecommunication system.

One such cable management cabinet is disclosed in U.S. patent application Ser. No. 08/049,055 filed Apr. 16, 1993 and assigned to the assignee of the present application. Cables enter through entrance holes through the cabinet floor in jacketed bundles, with the bundle jacket removed and individual cables secured to tie down bars proximate the entrance and routed to and upwardly along one or the other side of a central splice tray array, and individual fibers are carefully routed about arcuate bend radius limiters to particular trays to be spliced to associated fibers of other cables, with the bend radius limiters assuring that the fibers are not stressed to assume too sharp a curve that may damage or destroy the fibers nor degrade the signal being transmitted therealong.

Recently an innovative system has been devised for installing fiber optic cables in a building and also between buildings, involving the preliminary placing and securing of somewhat flexible cable-holding routing tubes along the route of the cables from a first location to a second location. Several fiber optic cables are then placed within such an installed routing tube by firmly affixing to the ends of the cables a tow member having an outer diameter incrementally smaller than the inside diameter of the routing tube and adapted to be projected through the tube by a burst of air at sufficient pressure (i.e., "blown"), towing the cables through the routing tube to and beyond the far end, whereafter the tow member is removed and the individual fibers are broken out of the cables to be spliced. Such routing tubes must be carefully secured along their paths in a manner that does not reduce the inside diameter of the tubes below a critical threshold, and the tubes must be so affixed at curve or turn locations to define a curve having a radius greater than a desired minimum to permit passage of the bullet member without snagging.

It is desired to provide a cable management cabinet or pedestal adapted for receipt thereinto of many "blown" fiber cables for splicing of the optical fibers thereof.

It is further desired to provide a manner of affixing the routing tube of "blown" fiber cables in an appropriate manner to permit installation of the cables thereafter.

SUMMARY OF THE INVENTION

The cable management pedestal of the present invention provides for receipt of fiber optic cable articles, and especially where such cables are contained within somewhat flexible routing tubes for blown fiber cable, through cable exits at a cable-receiving region and includes a central splice tray array for splicing of the individual fibers of ones of the cables to associated fibers of others of the cables. Arrays of tube holder assemblies of the present invention are positioned at a plurality of locations vertically along cable routing regions alongside the central splice tray array, along sidewalls of the cabinet. Additional tube holder assemblies of the present invention are positioned proximate each side of each splice tray and aligned therewith, such that cables held by a particular such tube holder assembly are held thereby in an orientation for the fibers of such cables extending from the routing tube ends to be generally parallel to the splicing surface of the desired splice tray.

A holder assembly useful with the present invention is disclosed in U.S. patent application Ser. No. 8/380,875 filed Jan. 30, 1995. The tube holder assembly includes a pair of opposed arms having rigid support sections such as support members affixed to a mounting section at a first end of the assembly and coextending to a second end thereof whereat they are adapted to be fastened together in a manner permitting and facilitating unfastening and refastening, defining a tube receiving slot therebetween extending from an entrance at the second end toward and to the first end. Along each rigid support member adjacent the tube receiving slot is a tube engaging member or insert of elastically compressible material. The pair of tube engaging inserts preferably are spaced apart a distance less than the outer diameter of the smallest routing tube for which the routing tube holder assembly is adapted to be used.

Essentially, in an especially useful application of the present invention, a routing tube is installed into the tube holder assembly by being translated laterally into the entrance to the tube receiving slot at the second end when the rigid support members are unfastened, and urged inwardly along the tube receiving slot toward the first end to a desired position, all while being engaged and controllably held by the opposed tube engaging inserts in a manner permitting such movement but assuredly holding such routing tube when released following full insertion. The elastically compressible material is selected to be deformable enough to engage and assuredly hold the routing tubes inserted along the tube receiving slot without deforming the tubes in a manner reducing the inside diameters of the tubes; the material could be small-celled foam elastomer, for example. When all routing tubes desired to be inserted are so inserted, the rigid support members are then fastened. The support members of the tube holder assembly are affixed to a mounting member in a manner permitting incremental pivoting relatively toward each other to permit engagement and disengagement of the fastening member at the second end.

It is an objective of the present invention to provide a cable management pedestal adapted to be suitable for the optical interconnection of optical fibers of a plurality of fiber cables, and also where such cables are to be blown through routing tubes.

It is another objective of the present invention to provide a means affixed to a framework of the pedestal for assuredly holding at least one such routing tube for a blown fiber cable bundle without deformable clamping thereof, for use in routing such a bundle.

It is an additional objective for such holding means to be suitable for holding a plurality of such routing tubes in a single row, and to permit adding of additional such tubes while continuing to hold previously inserted ones thereof.

Embodiments of the present inventions will now be described by way of example with reference to the accompanying drawings.

DETAILED DESCRIPTION OF THE PREFERRED EMBODIMENTS

Figure 1:
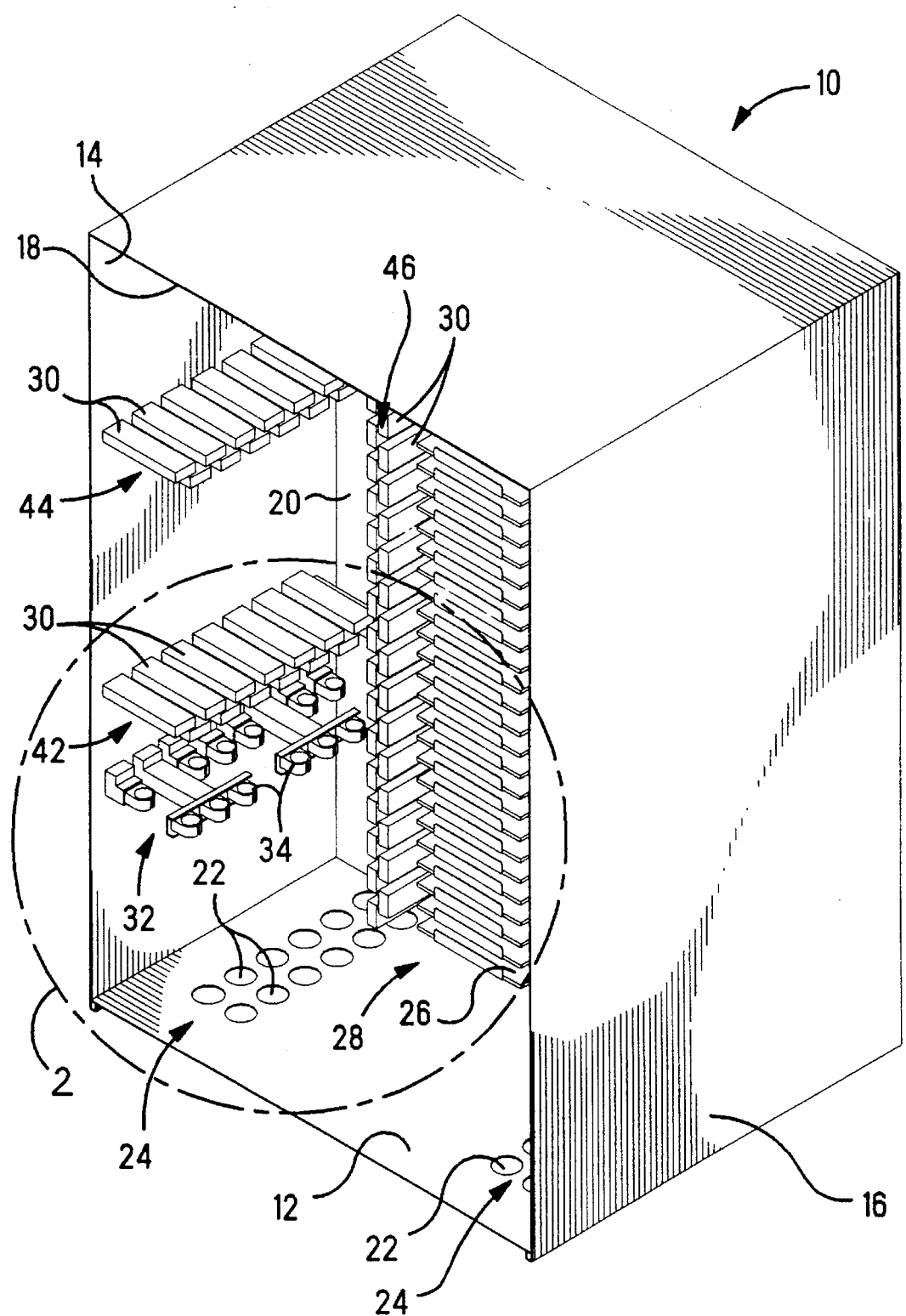
FIG. 1 is an isometric view of the interior of the pedestal of the present invention showing a central splice tray array and an arrangement of tube holders of the present invention along one side of the splice tray array defining a cable routing region, for holding of routing tubes following insertion into the pedestal from cable entrances along the bottom to direct the routing tubes to selected ones of the splice trays.
Figure 2:
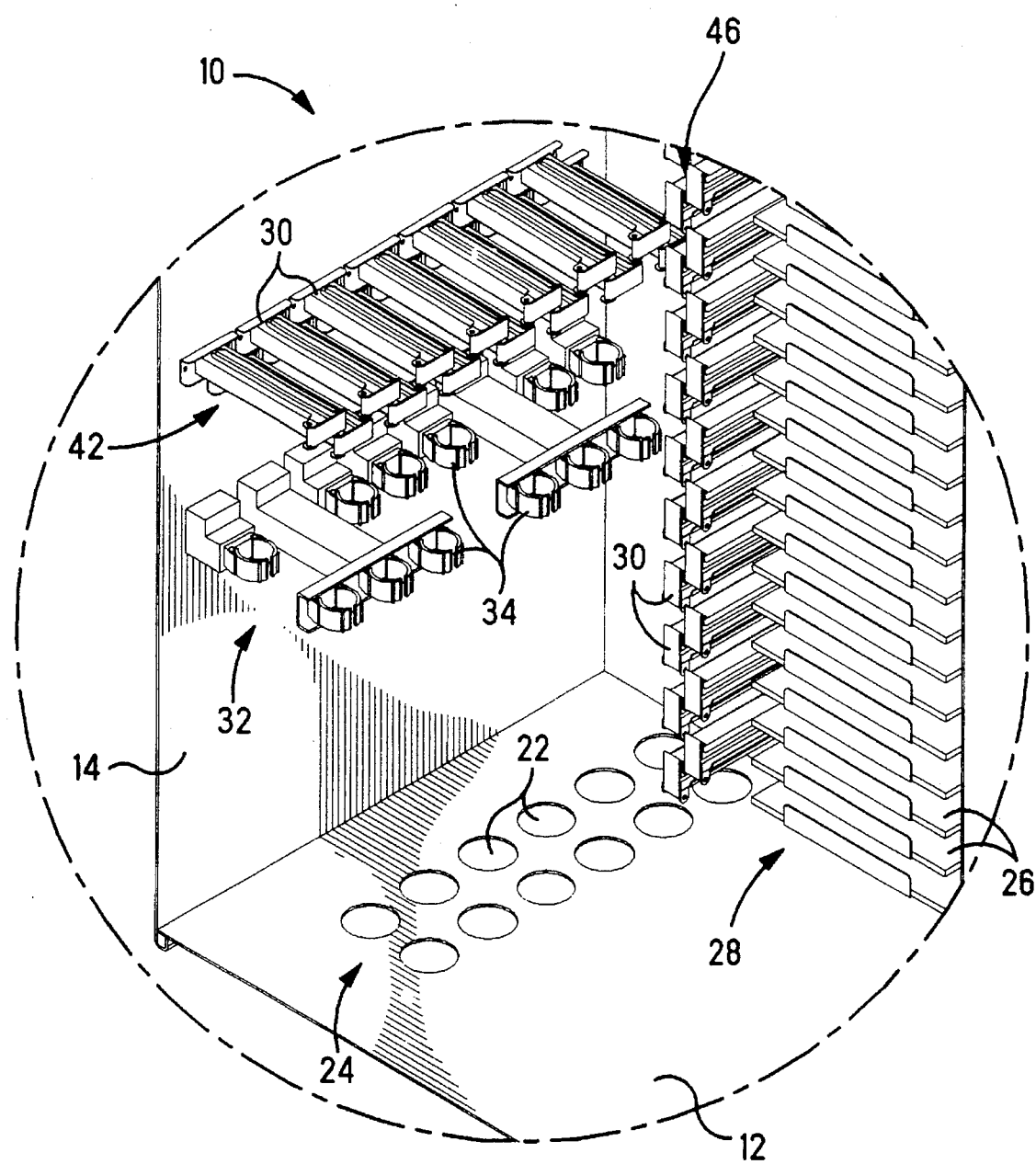
FIG. 2 is an enlarged isometric view of a portion of the cable routing region of FIG. 1.
Figure 3:
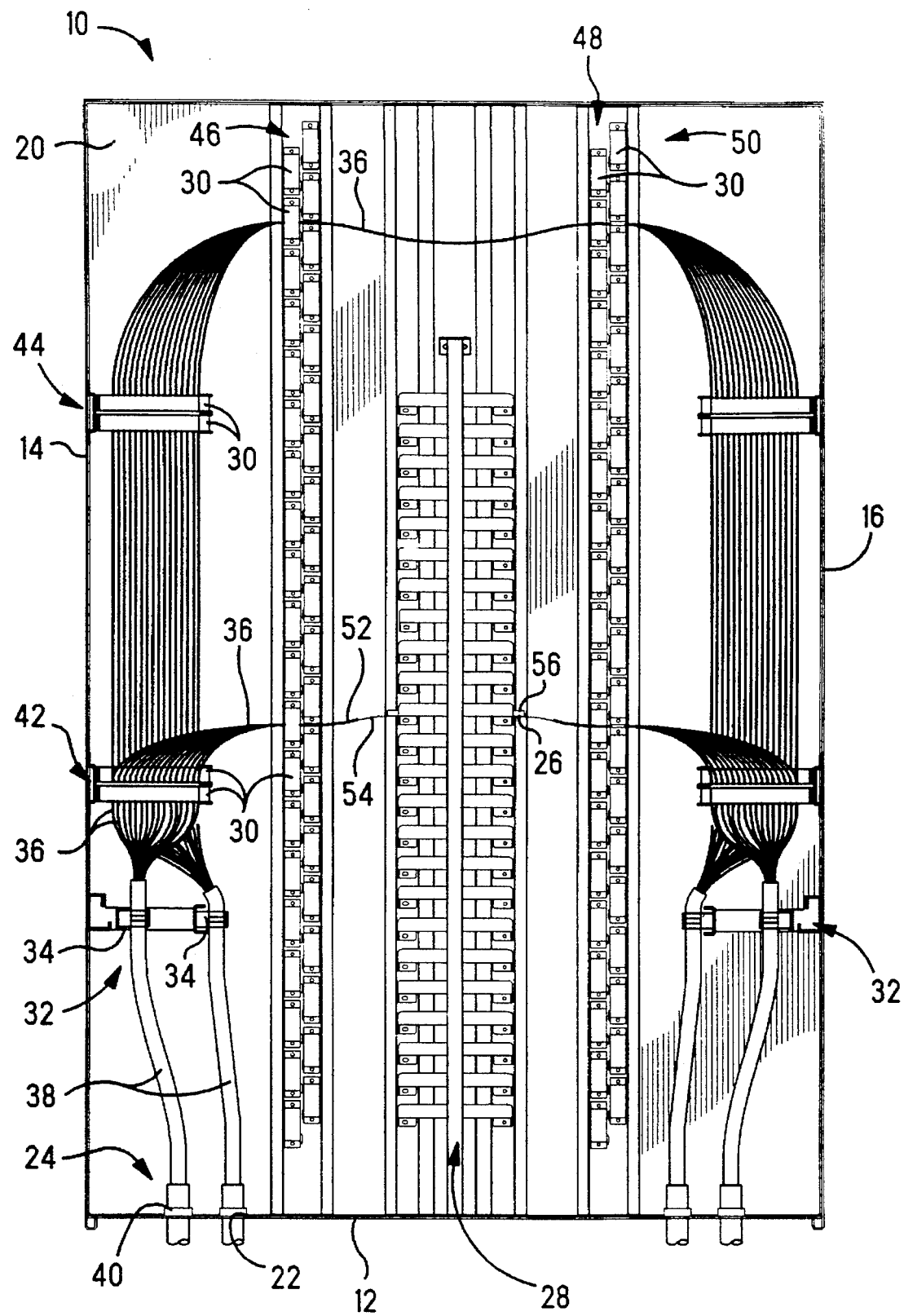
FIG. 3 is an elevation view of the pedestal of FIGS. 1 and 2 illustrating routing tubes routed through the cable routing regions of the pedestal, with associated ones thereof routed to a selected splice tray, and the others thereof, bypassing the splice trays for passing through the pedestal.

Pedestal 10 of FIGS. 1 to 3 includes a cabinet or enclosure having bottom wall 12, side walls 14,16, top wall 18, back wall 20 and a door (not shown) of the general type suitable for outdoor installation by being rugged, durable and environmentally sealed. Cable entrances 22 are defined in cable entry areas 24 preferably along bottom wall 12 and may be positioned in pairs extending from proximate the front of the pedestal toward back wall 20. An array of fiber optic splice trays 26 is illustrated preferably centrally of side walls 14,16 in a central splicing region 28. Along each side of central splicing region 28 mounted to side walls 14,16 are arrays of tube holders 30 defining cable routing regions 32. Preferably an array of cable management clips 34 associated with and positioned generally above respective cable entrances 22 are disposed in cable routing regions 32 proximate cable entry area 24 to provide a first means for holding bundles of routing tubes 36 still contained in protective stiff outer jackets 38 upon initial entry into the cable routing regions after entering the pedestal through cable entrances 22 about which are preferably disposed grommets 40 to provide sealing around the outer jackets 38 of the routing tube bundles.

Routing tubes 36 are broken out of the outer jackets 38 and are all held by a first array 42 of tube holders 30 near cable management clips 34. Tube holders 30 of first array 42 extend from side walls 14,16 toward central splicing region 28, and thus hold a plurality of routing tubes 36 in rows from front to back. Each cable management clip 34 is associated with a respective cable entrance 22 and a respective tube holder, and is positioned generally in line between them, thus minimizing any bending of the routing tubes near the cable entry area. Selected rows of routing tubes 36 are associated with respective splice trays 26, and a selected row of routing tubes 36 will then be routed to the vertical location of the associated splice tray. Optionally a second array 44 of tube holders 30 may be utilized upwardly from first array 42 to hold those routing tubes not being directed to splice trays therebelow.

Additional arrays 46,48 of tube holders 30 are mounted to back wall 20 extending forwardly toward the front along both sides of the central splicing region, and thus hold a plurality of routing tubes 36 horizontally in single rows spaced vertically. Tube holders 30 of arrays 46,48 are associated with particular splice trays 26, although as seen in FIG. 3 certain holders 30 may be utilized to define a bypass arrangement at bypass region 50 whereby particular routing tubes may extend continuously through the pedestal where splicing is not desired for the fibers of the cables to be held therewithin. Once end portions of routing tubes 36 are secured in the tube holders 30 of arrays 46,48 in horizontal orientations, the fiber optic cables 52 exiting the tube ends may be broken out to free the end portions 54 of the optical fibers already generally oriented parallel to the splicing surface 56 of the splice tray for splicing to associated optical fibers entering the central splicing region from the opposite side of the splice tray.

Figure 4:
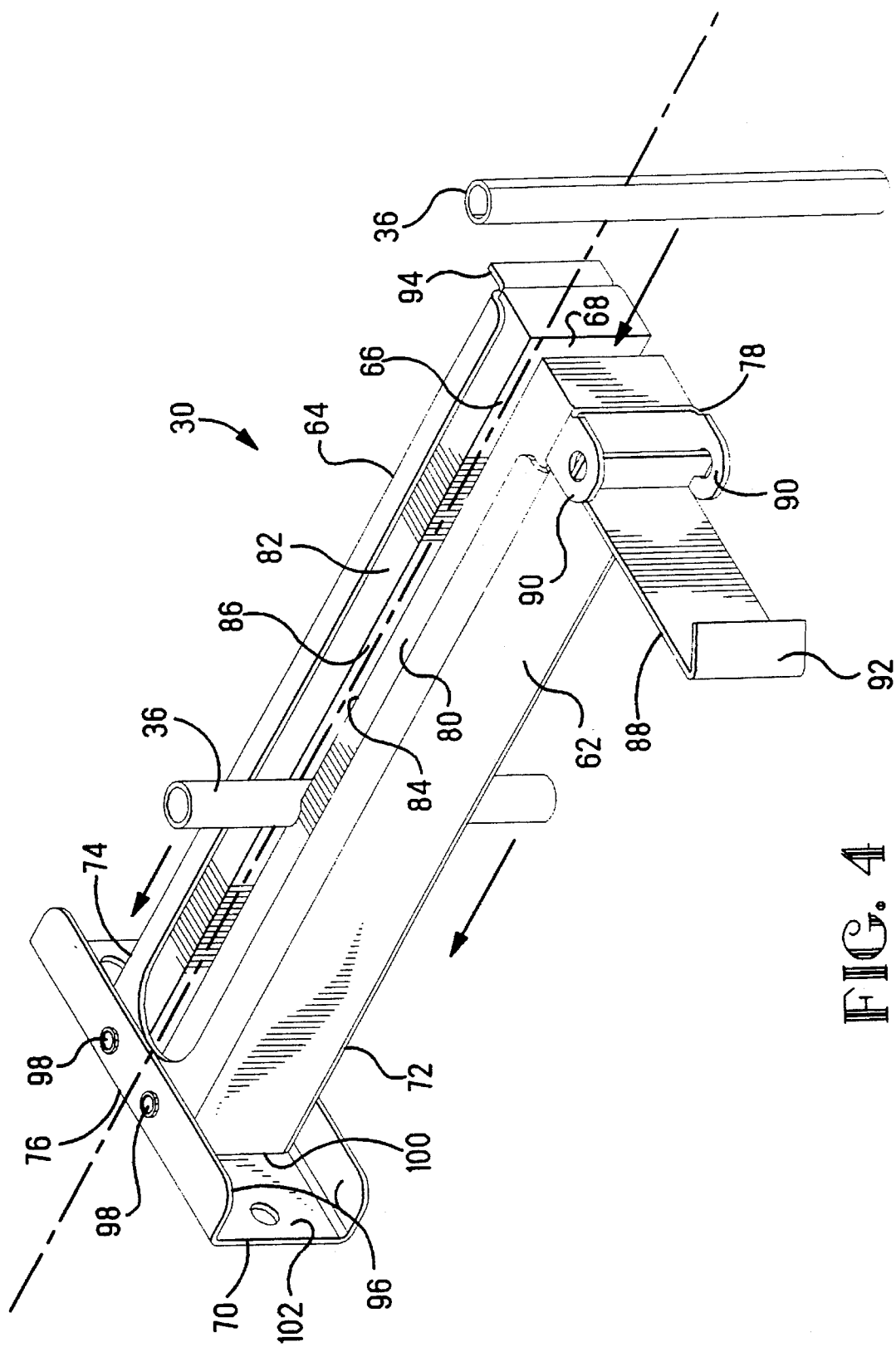
FIG. 4 is an enlarged isometric view of a tube holder containing a routing tube therein and a second routing tube positioned to be inserted into the tube-receiving region of the tube holder.
Figure 5:
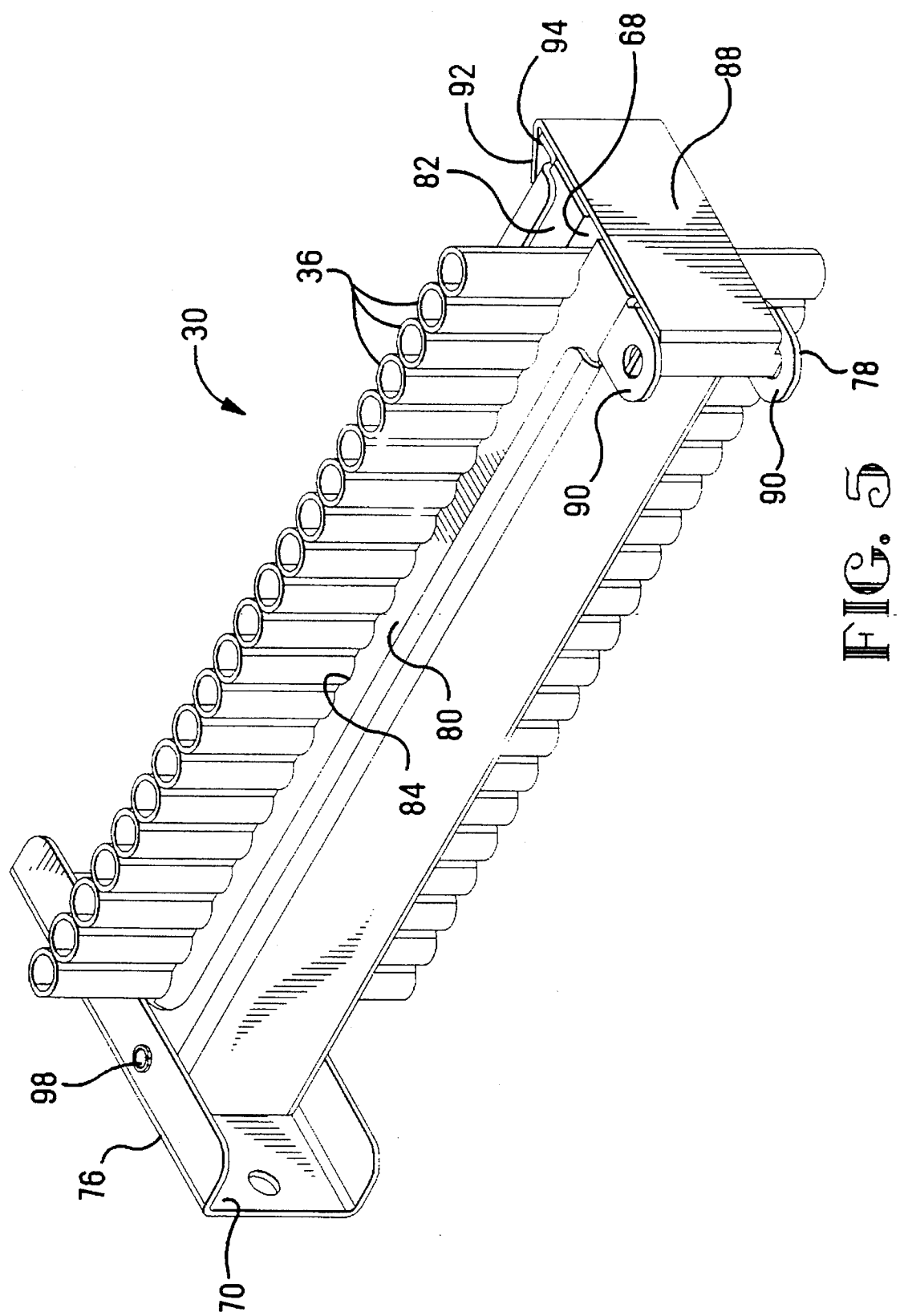
FIG. 5 is an enlarged isometric view similar to FIG. 4 fully loaded with tube holders and fastened shut.
Figure 6:
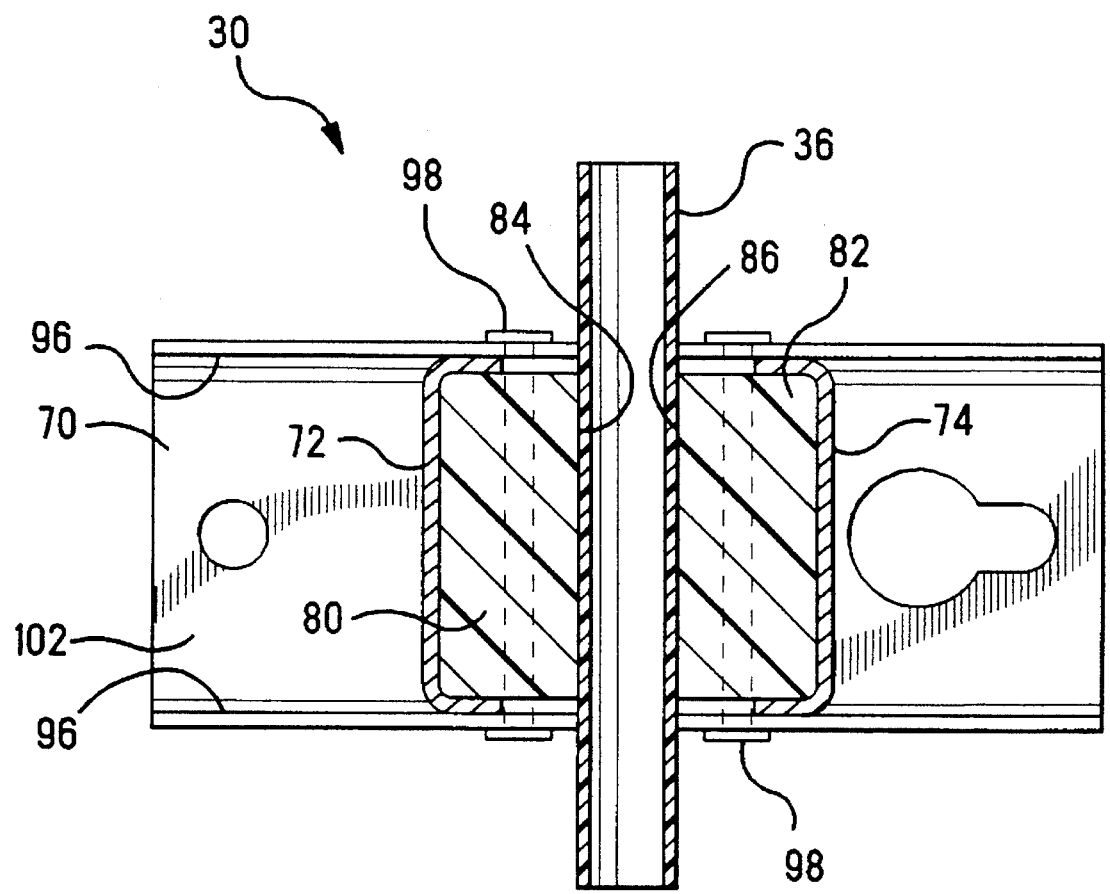
FIG. 6 is a section view of the tube holder of FIGS. 4 and 5 showing a routing tube held thereby.

Referring now to FIGS. 4 to 6, a tube holder 30 is seen to have two opposed arms 62,64 defining therebetween a tube receiving slot 66 extending from entrance 68 toward a mounting section such as bracket member 70 of the tube holder assembly. A pair of rigid support sections such as rigid U-shaped members 72,74 extend from first end 76 to second end 78 of holder 30, and are affixed to mounting bracket 70 at first end 76 and latchable together at second end 78 to close entrance 68 of tube receiving slot 66. Each support member 72,74 is preferably U-shaped defining channels facing toward each other upon assembly, and elastically compressible inserts 80,82 are affixed such as by adhesive within the U-shaped channels to extend outwardly of the channels toward each other, defining tube receiving slot 66 between spaced tube engaging surfaces 84,86 thereof. Support members 72,74 should envelop sufficient portions of inserts 80,82 to secure them against any tendency to be moved if routing tubes 36 are stressed axially.

Preferably, a latch member 88 is pivotally secured to mounting tabs 90 at an end of one of support members 72,74 in a manner permitting manipulation to be rotated into a latched position by means of hook 92 at the free end of latch member 88 over latching tab 94 of the other of support members 72,74 at second end 78 of holder 30. Rigid support members 72,74 are affixed to mounting bracket 70 through flanges 96 such as by rivets 98 (or, optionally, roll pins or the like) spaced from ends of the support members. Such rivets are oriented parallel to the end edges and the tube engaging surfaces of the inserts; this arrangement permits incremental movement of support members 72,74 by reason of end edges 100 of at least one of the U-shaped support members being incrementally spaced from wall section 102 of mounting bracket 70. Thus the rigid support members (or one thereof) may be moved incrementally relatively toward and away from each other to permit engagement and disengagement of the latching arrangement. Optionally, the support members could be of stiff material having very slight flexibility to permit latching and unlatching, and could thus be formed integrally with the mounting section of the tube holder.

FIGS. 4 and 5 illustrate placement of routing tubes 36 into the tube receiving slot of a tube holder 30. In FIG. 4 it is seen that tube receiving slot 66 is dimensioned to be somewhat smaller than the diameter of a routing tube 36 so that deformation of the elastically compressible inserts 80,82 results in compression about routing tube 36 even before the rigid support members are latched together, but with the compressive force limited such that routing tube 36 may be easily moved along tube receiving slot 66 to be positioned at the farthest available position along the slot. FIG. 5 illustrates that a plurality of such routing tubes 36 may be held by each tube holder, such as up to eighteen or so, if desired.

With the present invention, each routing tube 36 remains secured between the opposed inserts 80,82 when the rigid support members 72,74 are latched and also when they are unlatched. This permits adding more routing tubes to the holder after initial installation, and even permits removal of routing tubes from the positions nearest the entrance without disturbing the remaining routing tubes in the slot. In pedestal 10, the entrances to all tube holders 30 face inwardly from side walls 14,16 and forwardly from rear wall 18 for ease of access, and those of arrays 42,44 are spaced from central splicing region 28, all facilitating later addition of routing tubes to, or removal from, particular tube receiving slots and defining a generous clearance space for performance of work within the pedestal.

Preferably, elastically compressible inserts 80,82 are of a microcellular foam elastomeric material such as PORON high density microcellular open celled urethane, Product No. 4701-01, sold by Poron Materials Division of Rogers Corporation of East Woodstock, Conn. The dimension of the tube receiving slot may be between one-fourth and three-fourths of the outer diameter of a routing tube 36, for example, to attain a limited amount of compressive engagement that will hold the routing tube firmly in position without deforming the routing tube inwardly, thus not impinging on the blowing of the fiber cable harness through the routing tube once the routing tube has been fully placed in position within the pedestal and elsewhere along its route. The mounting bracket, the latch member, and the support members may be for example stamped and formed of stainless steel.

Variations and modifications of the pedestal of the present inventions may occur to the artisan, and are within the spirit of the invention and the scope of the claims.

We claim:

1. A pedestal for interconnection of fiber optic members within fiber optic cable articles, comprising:

an enclosure including side walls, a rear wall and top and bottom walls and having an array of fiber splicing trays disposed centrally of said side walls, one of said top and bottom walls including openings therethrough defining cable entrances at cable entry regions;

said enclosure further including at least one array of holders adjacent each said side wall proximate a respective said cable entry region, each said holder defining a receiving slot oriented to hold a row of said fiber optic cable articles in vertical orientations and extending toward an opposed said side wall from a respective said side wall to a slot entrance, and said holders of each said at least one array positioned from front to back within said enclosure to hold pluralities of fiber optic cable articles in parallel rows upon insertion thereinto from said slot entrance, all defining a pair of cable routing regions between each said side wall and said fiber splicing tray array; and said enclosure further including at least one array of said holders adjacent said fiber splicing tray array alongside each said cable routing region, each said holder extending forwardly from said rear wall to a slot entrance and defining a receiving slot oriented to hold a row of said fiber optic cable articles in horizontal orientations upon insertion thereinto from forwardly thereof, such that fiber optic members to be spliced with associated fiber optic members of other fiber optic cables concluding in the enclosure are generally aligned with a splicing surface of a respective said splice tray in said fiber splicing array for splicing upon being broken out from said fiber optic cables exiting ends of said plurality of fiber optic cable articles.

2. A pedestal as claimed in claim 1 wherein said ones of selected said fiber optic cable articles extend continuously in a bypass region between said arrays of holders alongside said cable routing regions adjacent said side walls.

3. A pedestal as claimed in claim 2 wherein said enclosure includes a second said holder array adjacent each said side wall adjacent said bypass region.

4. A pedestal as claimed in claim 1 wherein said enclosure includes a second said holder array adjacent each said side wall.

5. A pedestal as claimed in claim 1 wherein each said cable entry area is located along said bottom wall of said enclosure.

6. A pedestal for interconnection of fiber optic cables suitable for cables of the type insertable into flexible routing tubes that are placed into position along the desired cable route prior to cable insertion, comprising:

an enclosure including side walls, a rear wall and top and bottom walls and having an array of fiber splicing trays disposed centrally of said side walls, one of said top and bottom walls including openings therethrough defining cable entrances at cable entry regions;

said enclosure further including at least one array of tube holders adjacent each said side wall proximate a respective said cable entry region, each said tube holder defining a tube receiving slot oriented to hold a row of said routing tubes in vertical orientations and extending toward an opposed said side wall from a respective said side wall to a slot entrance, and said tube holders of each said at least one array positioned from front to back within said enclosure to hold pluralities of routing tubes in parallel rows upon insertion thereinto from said slot entrance, all defining a pair of cable routing regions between each said side wall and said fiber splicing tray array; and said enclosure further including at least one array of said tube holders adjacent said fiber splicing tray array alongside each said cable routing region, each said tube holder extending forwardly from said rear wall to a slot entrance and defining a tube receiving slot oriented to hold a row of said routing tubes in horizontal orientations upon insertion thereinto from forwardly thereof, such that fiber optic members to be spliced with associated fiber optic members of other fiber optic cables concluding in the enclosure are generally aligned with a splicing surface of a respective said splice tray in said fiber splicing array for splicing upon being broken out from said fiber optic cables exiting ends of said plurality of routing tubes.

7. A pedestal as claimed in claim 6 wherein said routing tubes of selected fiber optic cables extend continuously in a bypass region between said arrays of tube holders alongside said cable routing regions adjacent said side walls.

8. A pedestal as claimed in claim 7 wherein said enclosure includes a second said tube holder array adjacent each said side well adjacent said bypass region.

9. A pedestal as claimed in claim 6 wherein said enclosure includes a second said tube holder array adjacent each said side wall.

10. A pedestal as claimed in claim 6 wherein each said cable entry area is located along said bottom wall of said enclosure.

11. A pedestal as claimed in claim 10 wherein pluralities of said routing tubes are bundled in outer jackets for entry into said enclosure, and said enclosure includes an array of cable management clips positioned between said at least one tube holder array of each said cable routing region and a respective said cable entry area for holding a respective said jacketed routing tube bundle, with each said cable management clip associated with a respective said tube holder and oriented to hold said respective jacketed routing tube bundle in a vertical orientation generally aligned with said respective tube holder, all minimizing bending of said routing tubes within said enclosure.

12. A pedestal as set forth in claim 6 wherein each said tube holder comprises a pair of opposed arms secured to a mounting section mounted to a wall of said enclosure and coextending from said mounting section in parallel to free ends and spaced apart to define said tube receiving slot having said entrance at said free ends, each said arm including a rigid support section and an elastically compressible insert affixed thereto along said tube receiving slot, said elastically compressible inserts defining opposed tube engaging surfaces along said tube receiving slots, and said elastically compressible inserts comprised of material enabling engagement and holding in a nondeforming manner of each said routing tube inserted into said tube receiving slot from said entrance during and after insertion or removal of other said routing tubes from said tube receiving slot.

13. A pedestal as set forth in claim 12 wherein each said rigid support section is a member defining a U-shaped channel facing the other said rigid support member, and said respective elastically compressible insert is disposed within said U-shaped channel and extends outwardly thereof toward the other said elastically deformable insert to define said tube receiving slot between said tube engaging surfaces thereof.

14. A pedestal as set forth in claim 13 wherein a latch member is pivotally secured to said free end of one of said rigid support members to enable latching engagement with an associated latching section of said free end of the other of said rigid support members to close said entrance of said tube receiving slot upon completion of insertion of routing tubes thereinto.

15. A pedestal as set forth in claim 14 wherein said mounting section is a bracket member, and at least one said rigid support member is affixed to said bracket member in a manner permitting incremental movement toward the other said rigid support member to facilitate latching and unlatching of said latch member.

16. A pedestal as set forth in claim 15 wherein an edge of said at least one rigid support member is incrementally spaced from a wall section of said bracket member traversing an axis defined by said tube receiving slot, and said at least one rigid support member is affixed to said bracket member by a rivet parallel to and spaced from said edge and parallel to said tube engaging surfaces of said inserts and extending between opposed flanges of said bracket member extending along outer surfaces of end portions of said rigid support members, all enabling incremental pivoting movement of said at least one rigid support member toward the other during latching and unlatching of said latch member.

17. A pedestal as set forth in claim 13 wherein said material is small celled foam elastomer.

18. A pedestal as set forth in claim 17 wherein said material is high density microcellular open celled urethane.

\* \* \* \* \*